(12) United States Patent
Oesterwind

(10) Patent No.: US 11,738,803 B2
(45) Date of Patent: Aug. 29, 2023

(54) METHOD AND DEVICE FOR DETERMINING A SENSOR OFFSET

(71) Applicant: ZF Automotive Germany GmbH, Alfdorf (DE)

(72) Inventor: Tobias Oesterwind, Düsseldorf (DE)

(73) Assignee: ZF Automotive Germany GmbH, Alfdorf (DE)

( * ) Notice: Subject to any disclaimer, the term of this patent is extended or adjusted under 35 U.S.C. 154(b) by 470 days.

(21) Appl. No.: 16/814,427

(22) Filed: Mar. 10, 2020

(65) Prior Publication Data

US 2020/0290674 A1 Sep. 17, 2020

(30) Foreign Application Priority Data

Mar. 14, 2019 (DE) .......................... 102019106568.2

(51) Int. Cl.
*G01P 13/00* (2006.01)
*B62D 15/02* (2006.01)
*B62D 1/20* (2006.01)
*B62D 1/04* (2006.01)

(52) U.S. Cl.
CPC ............. *B62D 15/021* (2013.01); *B62D 1/04* (2013.01); *B62D 1/20* (2013.01); *G01P 13/00* (2013.01)

(58) Field of Classification Search
CPC .......... B62D 15/021; B62D 1/04; B62D 1/20; B62D 5/0457; B62D 15/025; G01P 13/00; G01P 21/00; G01P 21/02; G01D 18/008; G01G 23/01; G01L 25/00; G01L 25/003

USPC ........................................................... 701/41
See application file for complete search history.

(56) References Cited

U.S. PATENT DOCUMENTS

| 4,691,192 A * | 9/1987 | Baker ..................... G01L 3/109 341/11 |
| 4,697,168 A * | 9/1987 | Baker ..................... G01P 3/565 341/15 |
| 7,212,935 B1 * | 5/2007 | O'Brien .............. F02D 41/2474 701/87 |
| 2006/0113937 A1 * | 6/2006 | Hidaka .................. B62D 5/046 318/434 |

(Continued)

FOREIGN PATENT DOCUMENTS

| DE | 102005052015 A1 | 6/2006 |
| DE | 102011089950 A1 | 7/2012 |

(Continued)

*Primary Examiner* — Jonathan M Dager
*Assistant Examiner* — Jean W Charleston
(74) *Attorney, Agent, or Firm* — Robert James Harwood

(57) ABSTRACT

A method for determining a sensor offset of a sensor in a device, in particular in a steering system for a motor vehicle. The device has a first component, a second component which is movable with respect to the first component, a resetting element, an actuator and a sensor for determining the relative motion between the first component and the second component. The method comprises the following steps: firstly, a predetermined relative motion between the first component and the second component is generated by the actuator. The resulting relative motion is measured by means of the sensor, and the sensor data obtained from the measurement are stored. A constant sensor offset of the sensor is then determined on the basis of the stored sensor data. Furthermore, a device is described whose sensor offset can be determined by means of the method.

22 Claims, 3 Drawing Sheets

(56) References Cited

U.S. PATENT DOCUMENTS

| | | | |
|---|---|---|---|
| 2010/0315653 A1* | 12/2010 | Weingartz | G01S 17/58 356/620 |
| 2014/0025330 A1* | 1/2014 | Bhandari | G01P 21/00 702/99 |
| 2014/0249720 A1* | 9/2014 | Sintorn | F16F 9/125 701/41 |
| 2015/0019152 A1* | 1/2015 | Scheibenzuber | G01D 5/2448 702/94 |
| 2016/0265991 A1* | 9/2016 | Dixon | G01L 13/04 |
| 2017/0059666 A1* | 3/2017 | Horsley | G01R 33/0017 |
| 2017/0174252 A1* | 6/2017 | Hochrein | B62D 5/0412 |
| 2018/0231393 A1* | 8/2018 | Czaja | G01L 25/00 |
| 2019/0204114 A1* | 7/2019 | Berntorp | G01C 25/00 |
| 2020/0081030 A1* | 3/2020 | Currier | G01P 15/0802 |

FOREIGN PATENT DOCUMENTS

| | | | | |
|---|---|---|---|---|
| DE | 102013209459 A1 | | 11/2013 | |
| DE | 102017117610 A1 | * | 2/2019 | B60Q 9/00 |
| DE | 102017117610 A1 | | 2/2019 | |
| EP | 2674348 B1 | | 10/2017 | |

* cited by examiner

METHOD AND DEVICE FOR DETERMINING A SENSOR OFFSET

CROSS-REFERENCE TO RELATED APPLICATION

This application claims priority to German Patent Application No. 102019106568.2, filed Mar. 14, 2019, the disclosure of which is incorporated herein by reference in its entirety.

TECHNICAL FIELD

The present disclosure relates to a method for determining a sensor offset of a sensor in a device, in particular in a steering system for a motor vehicle.

BACKGROUND

A large number of different assistance systems, for example electric steering assistance systems, are used in modern motor vehicles. These steering assistance systems require a sensor for monitoring a plurality of components which are involved in the assistance system. It is therefore necessary, for example, to determine the position of the steering wheel in a motor vehicle so that the motion prescribed by the driver can be intensified in a desired fashion by the steering assistance system.

The sensors serve to determine the mechanical variables such as, for example, the length, the force or torque. However, sensors frequently have a design-induced constant offset which can falsify the measured variables. Therefore, methods for offset correction are necessary in order to be able to achieve sufficient measuring accuracy.

SUMMARY

The object of the present disclosure is to make available a simple method and a device for determining a sensor offset.

The object is achieved by a method for determining a sensor offset of a sensor in a device, in particular in a steering system for a motor vehicle, which has a first component, a second component which is movable with respect to the first component, a resetting element, an actuator and a sensor for determining the relative motion between the first component and the second component. Firstly, a predetermined relative motion between the first component and the second component is generated by the actuator. The resulting relative motion is measured by means of the sensor, and the sensor data obtained from the measurement are stored. A constant sensor offset of the sensor is then determined on the basis of the stored sensor data.

The method can correspondingly be applied in all situations in which two components which are movably arranged with respect to one another are present and can be monitored by means of a sensor. The relative motion can be here either a translation or a rotation. The two components must be able to be move freely so that the relative motion is controlled exclusively by the actuator.

Contributions by static friction between the components of the device, which can falsify the measurement or even make it impossible, are canceled out by the generation and measurement of a motion. Correspondingly, a measurement method is used in which exclusively dynamic friction components have to be taken into account. This significantly simplifies the measurement.

The method can also be carried out just once, for example even during the manufacture of a motor vehicle, since a constant sensor offset is determined. However, the measurement can also be repeated subsequently when necessary, in order to be able to determine changes in the sensor offset.

The resetting element can also be part of one of the components. In addition, the device can have a control unit which carries out the method for determining a sensor offset. In this case, the control unit is connected to the actuator and to the sensor.

The generated relative motion can be a periodic and symmetrical motion with maximum amplitudes. In this way, only symmetrical friction components occur in the dynamic state during the relative motion, as a result of which the evaluation of the sensor data is facilitated, since the contributions of the friction components cancel one another out. The relative motion can preferably be sinusoidal or can be sensed in the form of square-wave signals or triangular signals by the sensor. A sinusoidal relative motion can be generated, for example, by the actuator initiating an oscillation motion.

In one preferred embodiment, the relative motion is measured over a plurality of oscillation periods. This makes it possible to reduce measurement errors with respect to the determination of the maximum amplitudes. A periodic motion is preferably executed with a frequency of 10 Hz over a total duration of one second.

The constant sensor offset can be determined as an arithmetic mean of the maximum amplitudes of the relative motion in the positive and negative directions within the at least one oscillation period from the stored sensor data. The maximum amplitudes in the positive and negative directions have, as a result of the symmetry of the excitation, the same value caused by the actuator, but with different signs. Since, in contrast to this, the constant sensor offset is included with the same sign in the positive and negative maximum amplitudes, said sensor offset can be determined by means of the arithmetic mean of the two maximum amplitudes. This makes the evaluation very easy.

The motion can preferably be generated if the device is otherwise unactivated, in particular if a steering wheel of the steering system is unactivated and/or is without contact with hands. Since the method initiates a relative motion between the first and second components via the actuator, the free motion of the second component is measured in relation to the first component. If the second component is additionally activated or arrested during the relative motion, the generated motion is modified and the result of the calibration is correspondingly falsified. For example when the method is used to calibrate a steering system of a motor vehicle it can therefore preferably be corned out at the end of the manufacture of the motor vehicle.

In a further preferred embodiment, a user of the device can be informed of a lack of activity by the generated motion. The method can therefore be earned out, for example, when a driver of a motor vehicle lets go of the steering wheel during travel. This can be detected by means of a hands-off detection system. The driver can then be informed, by a vibration of the steering wheel, that his hands are no longer on the steering wheel. This vibration can be used at the same time to calibrate the sensor.

The relative motion can be a rotational motion or a translator emotion between the first component and the second component. The type of motion used depends on the type of sensor to be calibrated and the first and second components which are present. It is therefore possible, for example, to calibrate a torque sensor by means of a relative motion of an upper steering train relative to a lower steering train of a motor vehicle.

In addition, a position-dependent deviation of the measured sensor data is determined on the basis of a maximum disruption, a disruption position in which the maximum disruption occurs, and the current position of the components with respect to one another, in particular where the maximum disruption and the disruption position are previously known. Disruption can occur, for example, owing to asymmetrical weight distributions at the first and/or second component, as a result of which additional position-dependent forces occur and affect the sensor signal.

The degree and the position-dependent change in the disruption can already be determined experimentally before the calibration or may be known on the basis of knowledge about the components involved. In the case of a rotational motion for determining the sensor offset, for example when a steering train rotates, the disruption position can be defined as a disruption angle.

In addition the object is achieved by a device, in particular a steering wheel system for a motor vehicle, having a first component, a second component which is movable with respect to the first component, a resetting element, an actuator for generating a relative motion between the first component and the second component, a sensor for determining the relative motion between the first component and the second component, and a control unit for controlling the actuator and the sensor, wherein the control unit is designed to execute the method described above.

The sensor can be here a force sensor, a torque sensor, a weight sensor, an acceleration sensor and/or a rotational acceleration sensor. All these sensors are based on the measurement of a mechanical variable which can be attributed to a relative motion of two elements with respect to one another. The sensor can be, for example, an optical sensor or a strain gauge. So that a sensor is suitable for the method, the sensor must be able to measure a displacement or rotation of one component relative to the other component.

In one preferred embodiment, the device is a steering system for a motor vehicle which has an upper steering train which constitutes the first component, and a lower steering train which constitutes the second component In addition, the resetting element can be a torsion rod which connects the upper steering train to the lower steering train in a torque-transmitting fashion, wherein the sensor is configured to measure a rotation of the torsion rod. The relative motion can be a rotational motion or a translator emotion between the first component and the second component. The type of motion used depends on the type of sensor to be calibrated and the first and second components which are present. It is therefore possible, for example, to calibrate a torque sensor by means of a relative motion of an upper steering train relative to a lower steering train of a motor vehicle.

Correspondingly, during the operation of the motor vehicle the sensor serves to monitor the position of the steering wheel. This can be utilized, for example, to indicate the direction desired by the driver of the motor vehicle to an electric steering assistance system.

Sufficiently high accuracy of the sensor can also be obtained in order to detect even small changes in angle of the steering wheel. These changes can occur, for example, when the driver of the motor vehicle lets go of the steering wheel during travel. Reliable detection in this case is of great importance, for example for a hands-off detection system.

It is possible that the steering wheel has an asymmetrical weight distribution so that the maximum disruption is dependent on the weight distribution and/or on the mounting angle of the steering wheel. Since the weight distribution of the steering wheel is known in advance, the influence of this disruption on the determination of the sensor offset can be correspondingly taken into account.

BRIEF DESCRIPTION OF THE DRAWINGS

Further features and advantages of the present disclosure can be found in the following description and the drawings, in which.

DETAILED DESCRIPTION

Figure 1:
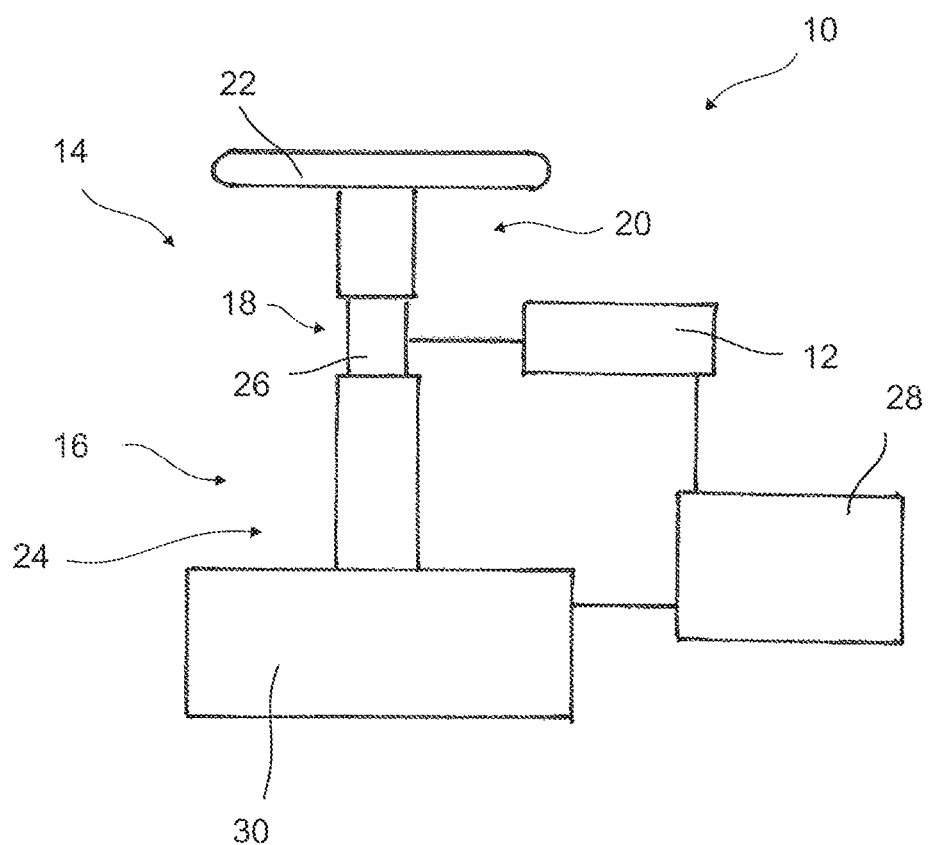
FIG. 1 shows a device according to the present disclosure for determining a sensor offset.

FIG. 1 shows a device 10 for determining a sensor offset of a sensor 12. In the embodiment shown the device 10 is a steering system for a motor vehicle (not shown) having a first component 14, a second component 16, a resetting element 18, a control unit 28 and an actuator 30.

The first component 14 is an upper steering train 20 which has a steering wheel 22. The second component 16 is a lower steering train 24. The upper steering train 20 is connected to the lower steering train 24 by means of the resetting element 18.

In the described exemplary embodiment the resetting element 18 is a torsion rod 26, by which the upper steering train 20 and the lower steering train 24 are connected in a torque-transmitting fashion.

The actuator 30, which can set the lower steering train 24 in motion, is provided on the lower steering train 24.

The sensor 12 is a position sensor which monitors the position or rotation of the torsion rod 26, and can therefore detect the applied torque at the steering wheel 22.

The sensor 12 is connected to the control unit 28 which can execute the method for determining the sensor offset. For this purpose, the control unit 28 is additionally connected to the actuator 30.

In order to determine the sensor offset, the lower steering train 24 is set into a periodic motion (step S1 in FIG. 2) by the actuator 30 which is controlled by the control unit 28. This motion can occur, for example in a sinusoidal fashion in order to initiate a periodic vibration. In this context, it is sufficient to generate a vibration with a frequency of 10 Hz for approximately one second.

The motion of the lower steering train 24 is transmitted to the upper steering train 20 by means of the torsion rod 26, so that the upper steering train 20 and, for example, the steering rod 22 are also moved periodically.

Figure 2:
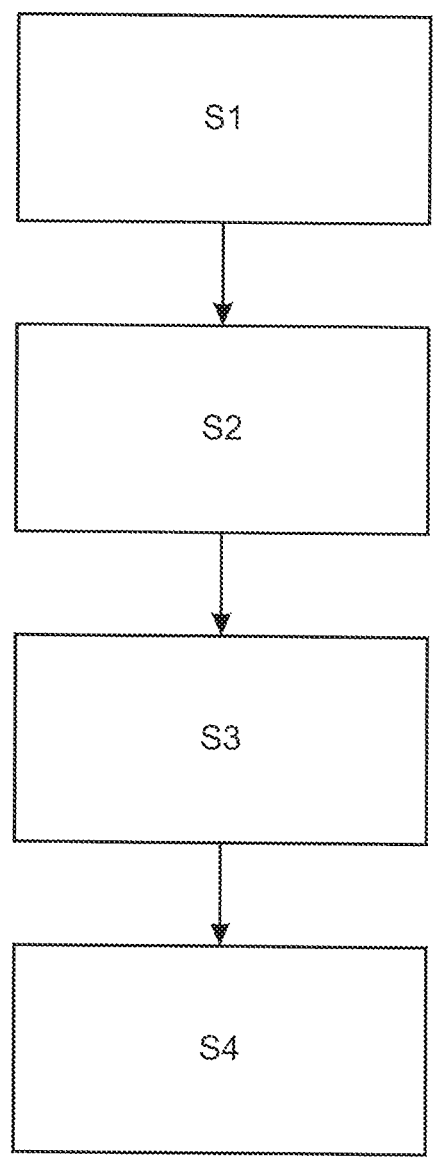
FIG. 2 shows a flow diagram of the method according to the present disclosure.
Figure 3:
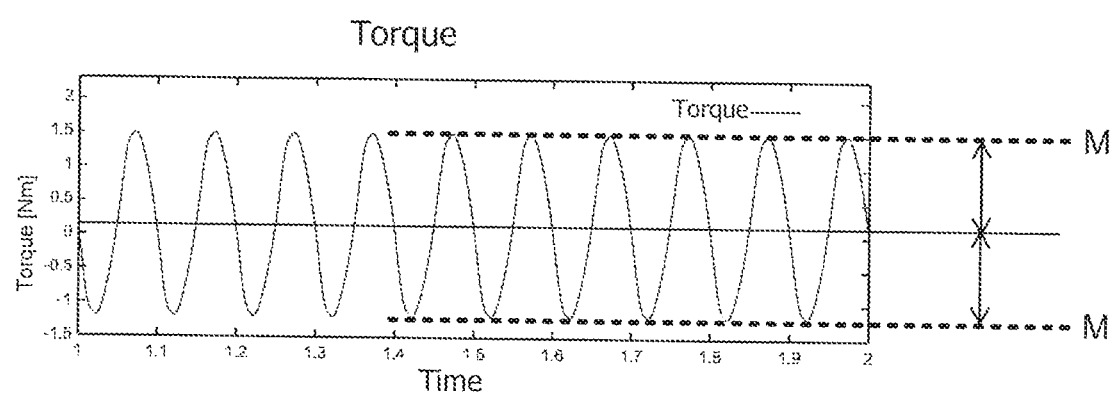
FIG. 3 shows a measurement series recorded during the method.

As a result, a periodic rotation of the torsion rod 26 occurs, which is sensed by means of the sensor 12 and therefore the resulting relative motion of the lower steering train 24 and of the upper steering train 20 is measured (step S2 in FIG. 2). FIG. 3 shows a measurement series of the resulting relative motion over a plurality of periods.

The sensor data obtained by the sensor 12 are stored in the control unit 28 and subsequently utilized in order to determine the constant sensor offset of the sensor 12.

For this purpose, the maximum amplitude M is determined in the positive and negative directions during the vibration, wherein said vibration is tracked over a plurality of oscillation periods (step S3 in FIG. 2). The arithmetic mean of the maximum amplitude is then calculated in the positive and negative directions (step S4 in FIG. 2) and the sensor offset of the sensor 12 is therefore obtained, Said sensor offset can be stored in the control unit 28 so that all future obtained measured values of the sensor 12 can be corrected by the sensor offset.

During the determination of the sensor offset it must be ensured that the upper steering train 10 can move freely. Correspondingly, the steering wheel 22 must not be arrested. Since the sensor offset is constant, it is therefore preferably already determined at the end of the assembly of the motor vehicle, since a free motion has to be ensured there.

Alternatively and/or additionally, the sensor offset can be newly checked and, if appropriate, adapted at regular intervals. It is therefore possible, for example, for calibration to take place when the driver of the motor vehicle lets go of the steering wheel 22. In this case, a hands-off detection system (not shown) ensures that the steering wheel 22 vibrates after a prescribed time period, in order to inform the driver that he no longer controls the steering wheel 22. For this purpose, the actuator 30 can also be used. The hands-off detection system can be connected to the control unit 28 so that at the same time the vibration can be utilized for the calibration of the sensor offset.

If the steering wheel 22 has an asymmetrical weight distribution, corresponding angle-dependent correction terms can be stored in the control unit 28 and applied to the sensor data obtained by the sensor 12.

In such a case, the measured sensor value can be determined according to the formula $$v_{sensor}(\varphi)=v+o+\tilde{o}\cos(\varphi-\vartheta)$$

where $v_{sensor}(\varphi)$ is the measured sensor value which is dependent on the angle $\varphi$, v is the real value which should be sensed by the sensor, o is the sensor offset, $\tilde{o}$ is the maximum position-dependent deviation which occurs owing to the asymmetrical weight distribution, and $\vartheta$ is the angle at which $\tilde{o}$ occurs. The measured sensor value changes correspondingly in an angle-dependent fashion in the form of circular function.

During the determination of the sensor offset, the corresponding contribution is extracted by calculation and subsequently included again in the measured sensor data during the operation of the motor vehicle.

What is claimed is:

1. A method for determining a sensor offset of a sensor in a steering system for a motor vehicle, the steering system having a first component, a second component which is movable with respect to the first component, a resetting element, an actuator and a sensor for determining the relative motion between the first component and the second component, wherein the method comprises the following steps:
   generating a predetermined relative motion between the first component and the second component by the actuator;
   measuring the resulting relative motion by means of the sensor;
   storing the sensor data obtained during the relative motion;
   determining a constant sensor offset of the sensor on the basis of the stored sensor data; and
   calibrating the sensor based on the determined constant sensor offset.

2. The method as defined in claim 1, wherein the generated relative motion is a periodic and symmetrical motion with maximum amplitudes.

3. The method as defined in claim 1, wherein the relative motion is sinusoidal or is sensed in the form of square-wave signals or triangular signals by the sensor.

4. The method as defined in claim 3, wherein the relative motion is measured over at least one oscillation period.

5. The method as defined in claim 2, wherein the constant sensor offset is determined as an arithmetic mean of the maximum amplitudes of the relative motion in the positive and negative directions within the at least one oscillation period from the stored sensor data.

6. The method as defined in claim 2, wherein the motion is generated if the device is otherwise unactivated.

7. The method as defined in claim 2, wherein a user of the device is informed of a lack of activity by the generated motion.

8. The method as defined in claim 2, wherein the relative motion is a rotational motion or a translatory motion between the first component and the second component.

9. The method as defined in claim 2, wherein a position-dependent deviation is determined on the basis of a maximum disruption, a disruption position in which the maximum disruption occurs, and the current position of the components with respect to one another, the maximum disruption and the disruption position being previously known.

10. A steering wheel system for a motor vehicle, the steering wheel system having a first component, a second component which is movable with respect to the first component, a resetting element, an actuator for generating a relative motion between the first component and the second component, a sensor for determining the relative motion between the first component and the second component, and a control unit for controlling the actuator and the sensor, wherein the control unit is designed to:
   actuate the actuator to generate a predetermined relative motion between the first component and the second component;
   control the sensor to measure the resulting relative motion;
   store the sensor data obtained during the relative motion;
   determine a constant sensor offset of the sensor on the basis of the stored sensor data; and
   calibrate the sensor based on the determined constant sensor offset.

11. The steering wheel system as defined in claim 10, wherein the sensor is a force sensor, a torque sensor, a weight sensor, an acceleration sensor and/or a rotational acceleration sensor.

12. The steering wheel system as defined in claim 10, wherein the steering system has an upper steering train which constitutes the first component, and a lower steering train which constitutes the second component.

13. The steering wheel system as defined in claim 12, wherein the resetting element is a torsion rod which connects the upper steering train to the lower steering train in a torque-transmitting fashion, wherein the sensor is configured to measure a rotation of the torsion rod.

14. The steering wheel system as defined in claim 12, wherein the upper steering train has a steering wheel, wherein the current position of the components with respect to one another for determining the position-dependent sensor offset is the steering angle.

15. The steering wheel system as defined in claim 14, wherein the maximum disruption is dependent on the weight distribution and/or on the mounting angle of the steering wheel.

16. The method as defined in claim 1, wherein the steps of the method are performed only when a driver of the motor vehicle does not contact a steering wheel of the steering system.

17. The method as defined in claim 1, wherein the sensor is a force sensor, a torque sensor, a weight sensor, an acceleration sensor and/or a rotational acceleration sensor.

18. The method as defined in claim 1, wherein the steering system has an upper steering train which constitutes the first component, and a lower steering train which constitutes the second component.

19. The method as defined in claim 18, wherein the resetting element is a torsion rod which connects the upper steering train to the lower steering train in a torque-transmitting fashion, wherein the sensor is configured to measure a rotation of the torsion rod.

20. The method as defined in claim 18, wherein the upper steering train has a steering wheel, wherein the current position of the components with respect to one another for determining the position-dependent sensor offset is the steering angle.

21. The method as defined in claim 1, wherein the method is carried out during the manufacture of the motor vehicle.

22. The method as defined in claim 1, wherein the method is carried out only during the manufacture of the motor vehicle.

* * * * *